Figures 1, 2:
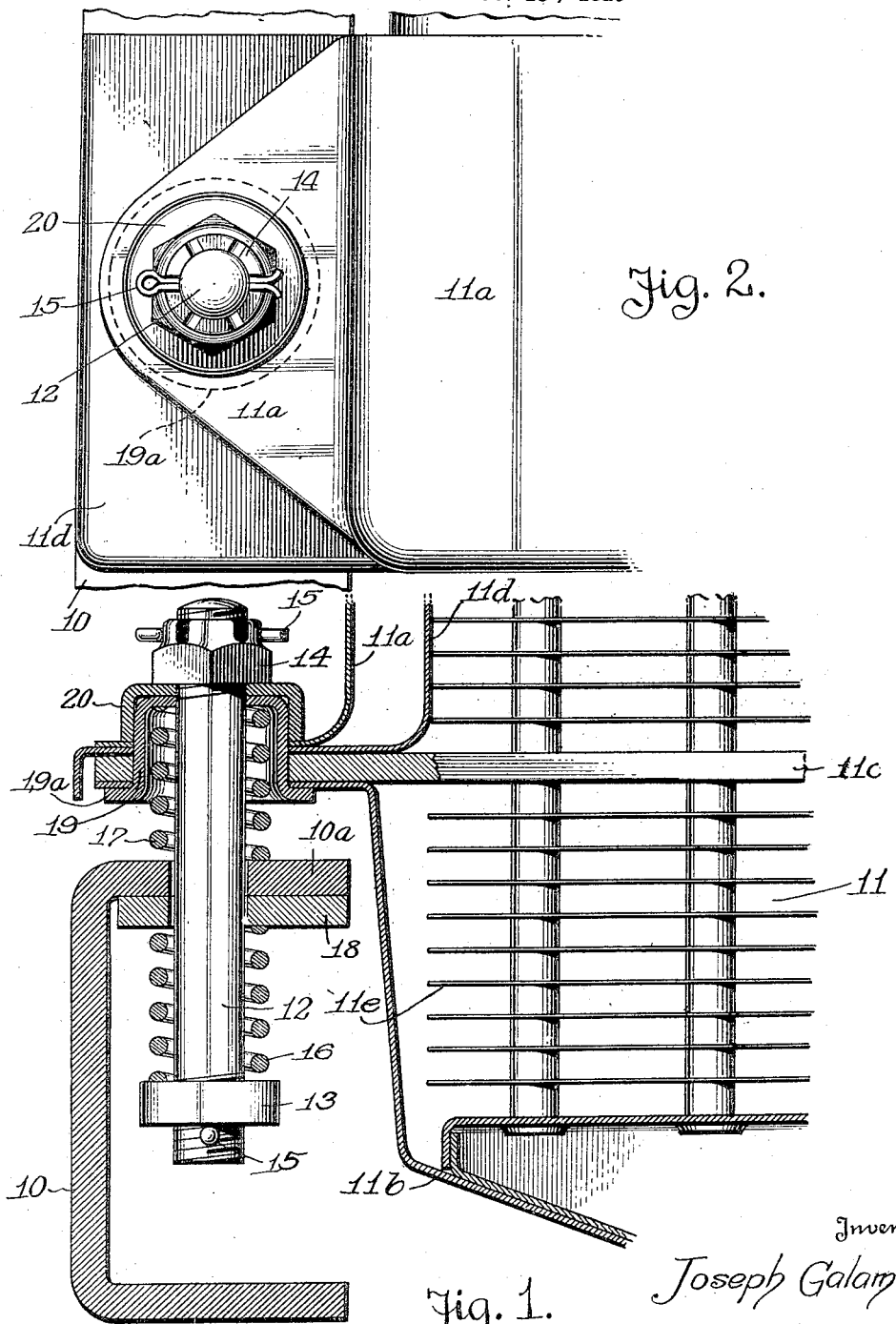

Feb. 26, 1924.

J. GALAMB

MOTOR VEHICLE

Filed Oct. 13, 1919

1,484,880

Inventor
Joseph Galamb.
By
Attorneys

Patented Feb. 26, 1924.

1,484,880

UNITED STATES PATENT OFFICE.

JOSEPH GALAMB, OF DETROIT, MICHIGAN, ASSIGNOR TO FORD MOTOR COMPANY, OF HIGHLAND PARK, MICHIGAN, A CORPORATION OF MICHIGAN.

MOTOR VEHICLE.

Application filed October 13, 1919. Serial No. 330,324.

*To all whom it may concern:*

Be it known that I, JOSEPH GALAMB, a citizen of the United States of America, residing at Detroit, in the county of Wayne and State of Michigan, have invented certain new and useful Improvements in Motor Vehicles, of which the following is a specification, reference being had therein to the accompanying drawings.

This invention relates to motor vehicles, pertaining more particularly to means for supporting the radiator formation on the frame of the vehicle chassis.

While the present invention is more particularly designed for use in connection with the general form of a radiator construction shown in my companion application filed October 22, 1917, Serial No. 197,764, it is not specifically limited to such formation. For purposes of illustration, however, the present invention is shown as applied to a formation of the type disclosed in said application, wherein the radiator carries a member which extends on opposite sides of a plane corresponding to a side of the core unit to produce a portion extending into the unit and a portion extending laterally therefrom to form a supporting structure for the unit.

In some cases, as for instance in commercial vehicles, tractors, etc., it is desirable to produce a more flexible connection between the radiator and the chassis frame, in order that the vibrations of the vehicle in use, such for instance, as may be provided by jolts, etc., may not be made effective on the connections to destroy the latter or affect the radiator structure itself. This strain is not materially active or damaging in pleasure cars having a radiator formation such as disclosed in the companion application, as demonstrated by the thousands of such cars in use; in heavy cars, however, the effect may be more pronounced and for this reason it may be desirable to produce a compensating arrangement.

The present invention is designed to produce this general result in simple and efficient manner, in such way as to permit its application to structures heretofore in use, and which can be manufactured at relatively low cost.

To these and other ends, the nature of which will be readily understood, said invention consists in the improved construction and combination of parts hereinafter more fully described, illustrated in the accompanying drawings, and more particularly pointed out in the appended claims.

In the accompanying drawings, in which similar reference characters indicate similar parts in each of the views,—

Figure 1 is a view, partly in section and partly in elevation, showing one way in which the invention can be applied to a radiator supporting connection of the type of radiator referred to, the view illustrating a portion only of the radiator construction.

Fig. 2 is a top plan view of portions of the same. 10 indicates a side frame member of the chassis, this generally being of channel formation. 11 designates a radiator formation which includes a jacket or shell $11^a$, brackets $11^b$, a cross-stay $11^c$, and which may include a casing $11^d$ extending over the ends of fins $11^e$. In the structure of the companion application, the assembly of these members at the point of support is with a bracket portion beneath the cross-stay, with a flange of the jacket above the stay and spaced therefrom by a spacing member or a flange of casing $11^d$, this assembly being mounted on the upper flange $10^a$ of frame 10, being secured in position in suitable manner. This provides a more or less rigid connection between radiator and frame.

While such connection is more or less rigid in the earlier construction, the rigidity is not damaging in ordinary motor vehicle practice, due to the presence of cross-stay $11^c$ which extends directly across the radiator heat dissipating unit, the jacket and lower bracket being tied therewith in producing the assembly.

In the present invention this rigidity of connection is changed to one of more flexible characteristic, the assembly remaining the same but having a more or less yielding relation to the frame 10. This is provided by the following arrangement:

12 indicates a bolt or rod-like element extending through and shiftable in an opening in flange $10^a$, thus permitting a more or less floating action of the element. The opposite ends of the bolt or rod are preferably threaded to receive nuts 13 and 14, although the lower end of the bolt or rod may have an integral head if desired. I prefer to employ suitable pins 15 for preventing the nut from being unthreaded accidentally. 16 and 17 indicate spring surrounding bolt or rod 12, spring 16 being located between nut 13 and a member 18 below flange 10ª, spring 17 being located between the upper face of flange 10ª and a flanged cup 19 which supports the assembly referred to, the assembly having an opening to permit the passage of the cup body, the assembly resting upon the flange 19ª of the cup, being held in position by a clip or cup 20 mounted on the bolt or rod beneath nut 14. Cup 19 and member 20 thus produce the characteristics of an annular clamping action on the assembly by the opposing action of nut 14 and spring 17.

By the use of the cup formation 19, it is possible to employ a spring 17 of the desired length and power without removing the assembly a too great distance from the flange 10ª, the parts being held in proper position by reason of the cup body passing through the assembly with member 20 more or less positioned by the body of the cup. As a result, the arrangement will be operative efficiently with a single point of connection with the radiator formation and without requiring more than a single point of guide relation in connection with frame 10, bolt or rod 12 being more or less floating with respect to both radiator and frame, although the floating action is mainly with respect to the frame.

As will be understood, both springs will normally be under compression, spring 17 providing the support for the radiator, spring 16 retaining head 14 in contact with member 20 to retain the desired relation of parts 19 and 20. Should the front wheel drop into a rut—permitting frame 10 to drop downwardly—any tendency of the radiator to continue to advance in the previous plane will tend to set up a small compression of spring 16 which tends to draw the radiator downward to restore the normal relation between springs 16 and 17, the movements, however, being more or less cushioned.

As will be understood the floating support not only acts as the supporting element for the radiator assembly but also additionally serves to position elements of the assembly relative to each other. This will be readily understood from the fact that the openings for the passage of cup 19 are individual and generally complemental to the peripheral configuration of the cup, and when the radiator assembly is completed by the positioning of jacket 11ª on to the remaining elements of the assembly, the cup serves to retain the relative positions of the core and jacket laterally. The advantage of this arrangement lies in the fact that both core and jacket are supported by the support instead of one by the other, thus not only ensuring the positive location of these parts relative to each other but also permitting the portion of the assembly which projects laterally to be of small dimensions vertically, this being made possible by the use of the cup of comparatively large dimensions to ensure extended support of the parts as well as an extended area within the clamping zone, thus preventing distortion during service activity.

Should the action be the reverse—as when the wheel strikes a projection in the road—the initial effect would be on spring 17 which would tend to raise the radiator accordingly, in restoring the normal spring relation.

While I have herein shown and described a preferred embodiment of the invention, it will be readily understood that changes or modifications therein may be found necessary or desirable in meeting the various exigencies of use and I desire to be understood as reserving the right to make any and all such changes or modifications as may be found desirable or essential in so far as the same may fall within the spirit and scope of the invention as expressed in the accompanying claims, when broadly construed.

Having thus described my invention what I claim as new is:—

1. The combination with chassis frame members having laterally-extending flanges, of means for supporting a radiator thereon, said means including a rod-like element extending vertically through a member flange and headed at its opposite ends, a yieldable element between the lower head and the flange, individual members mounted on the rod-like element below the upper head and adapted to engage opposite sides of a projecting assembly of the radiator, and a yieldable element between said members and the flange and forming a supporting element for the assembly adapted to space it from the flange, one of said engaging members being cup-shaped and having its cup of a depth sufficient to extend beyond the opposite planes of the assembly projection.

2. The combination with chassis frame members having laterally-extending flanges, of means for supporting a radiator thereon, said means including a rod-like element extending vertically through a member flange and headed at its opposite ends, a yieldable element between the lower head and the flange, individual members mounted on the rod-like element below the upper head and adapted to engage opposite sides of a projecting assembly of the radiator, and a yieldable element between said members and the flange and forming a supporting element for the assembly adapted to space it from the flange, one of said engaging members being cup-shaped and having its cup of a depth sufficient to extend beyond the opposite plane of the assembly projection, the upper yieldable element extending into the interior of the cup.

3. The combination with chassis frame members having laterally-extending flanges, of means for supporting a radiator thereon, said means including a rod-like element extending vertically through a member flange and headed at its opposite ends, a yieldable element between the lower head and the flange, individual members mounted on the rod-like element below the upper head and adapted to engage opposite sides of a projecting assembly of the radiator, and a yieldable element between said members and the flange and forming a supporting element for the assembly adapted to space it from the flange, one of said engaging members being cup-shaped with an outwardly extending flange, the cup flange being adapted to contact the under face of the projection assembly, said cup having a depth to carry its walls through the assembly and beyond the opposite face of the latter.

4. The combination with chassis frame members having laterally-extending flanges, of means for supporting a radiator thereon, said means including a rod-like element extending vertically through a member flange and headed at its opposite ends, a yieldable element between the lower head and the flange, individual members mounted on the rod-like element below the upper head and adapted to engage opposite sides of a projecting assembly of the radiator, and a yieldable element between said members and the flange and forming a supporting element for the assembly adapted to space it from the flange, the upper head of the rod-like element being removably secured to the element to permit ready removal of the assembly.

5. The combination with chassis frame members having laterally-extending flanges, of means for supporting a radiator thereon, said means including a rod-like element extending vertically through a member flange and headed at its opposite ends, a yieldable element between the lower head and the flange, individual members mounted on the rod-like element below the upper head and adapted to engage opposite sides of a projecting assembly of the radiator, and a yieldable element between said members and the flange and forming a supporting element for the assembly adapted to space it from the flange, one of said engaging members being cup-shaped and having its cup of a depth sufficient to extend beyond the opposite planes of the assembly projection, the complemental engaging member having a depressed portion into which the cup extends.

In testimony whereof I affix my signature in the presence of two witnesses.

JOSEPH GALAMB.

Witnesses:
 WALTER T. FISHLEIGH,
 J. K. HARNESS.